United States Patent
Benkert et al.

(10) Patent No.: US 10,510,246 B2
(45) Date of Patent: Dec. 17, 2019

(54) MEASUREMENT ARRANGEMENT AND METHOD FOR TEMPORARILY TRANSFERRING DIGITAL DATA FROM A SOURCE

(71) Applicant: Endress+Hauser Conducta GmbH+Co. KG, Gerlingen (DE)

(72) Inventors: Tilman Benkert, Stuttgart (DE); Björn Haase, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 15/452,785

(22) Filed: Mar. 8, 2017

(65) Prior Publication Data

US 2017/0270780 A1 Sep. 21, 2017

(30) Foreign Application Priority Data

Mar. 16, 2016 (DE) .......... 10 2016 104 919

(51) Int. Cl.
*H04B 5/00* (2006.01)
*H04W 4/80* (2018.01)
*G08C 17/04* (2006.01)

(52) U.S. Cl.
CPC .......... *G08C 17/04* (2013.01); *H04B 5/0075* (2013.01); *H04W 4/80* (2018.02); *G08C 2200/00* (2013.01)

(58) Field of Classification Search
None
See application file for complete search history.

(56) References Cited

U.S. PATENT DOCUMENTS

| 2004/0201602 A1 | 10/2004 | Mody et al. |
| 2004/0222300 A1 | 11/2004 | Strickland |
| 2007/0110620 A1* | 5/2007 | Pechstein ............. G01N 27/286 422/82.01 |

(Continued)

FOREIGN PATENT DOCUMENTS

| CN | 1678901 A | 10/2005 |
| CN | 104502718 A | 4/2015 |

(Continued)

OTHER PUBLICATIONS

Search Report for German Patent Application No. 10 2016 104 919.0, German Patent Office, dated Dec. 8, 2016, 50 pp.

*Primary Examiner* — Alejandro Rivero
(74) *Attorney, Agent, or Firm* — Kelly J. Smith; PatServe

(57) ABSTRACT

The present disclosure relates to a measurement arrangement including: a first process automation technology field device, wherein the first field device includes a first inductive interface and a data processing unit, and wherein a second process automation technology field device can be connected to the first interface; and a data transfer device having a second inductive interface that is designed to complement the first interface, wherein the data transfer device can be connected via this to the first field device, wherein the data transfer device includes a data transfer module with which digital data can be transferred from a source to the data processing unit of the first field device via the data transfer device and the first or second inductive interface. The present disclosure likewise relates to a method for temporarily transmitting digital data from a source to a field device.

10 Claims, 3 Drawing Sheets

(56) References Cited

U.S. PATENT DOCUMENTS

| | | | | |
|---|---|---|---|---|
| 2009/0228611 A1* | 9/2009 | Ferguson | ................ | G06F 8/60 |
| | | | | 710/8 |
| 2010/0281987 A1* | 11/2010 | Buschnakowski | ....... | G01H 3/00 |
| | | | | 73/658 |
| 2011/0053526 A1* | 3/2011 | Strei | .................. | H05K 7/1462 |
| | | | | 455/90.3 |
| 2015/0058738 A1* | 2/2015 | Benkert | ............... | G06F 3/0482 |
| | | | | 715/736 |

FOREIGN PATENT DOCUMENTS

| | | | |
|---|---|---|---|
| CN | 104567982 A | 4/2015 | |
| DE | 10218606 A1 | 11/2003 | |
| DE | 102013111714 A1 | 4/2015 | |
| GB | 2383231 A | 6/2003 | |
| WO | WO 2004102175 A1 * | 11/2004 | ........... G02N 27/286 |

\* cited by examiner

MEASUREMENT ARRANGEMENT AND METHOD FOR TEMPORARILY TRANSFERRING DIGITAL DATA FROM A SOURCE

CROSS-REFERENCE TO RELATED APPLICATION

The present application is related to and claims the priority benefit of German Patent Application No. 10 2016 104 919.0, filed on Mar. 16, 2016, the entire contents of which are incorporated herein by reference.

TECHNICAL FIELD

The present disclosure relates to a measurement arrangement and method for temporarily transferring digital data from a source by means of such a measurement arrangement.

BACKGROUND

Known from the prior art are field devices of various interfaces—for example, with an inductive interface. Here, a sensor or a measuring transducer should be cited as an example of a field device. For instance, a sensor can be connected with a superordinate unit via this inductive interface. These sensors are characterized in that, among other things, they can be quickly connected and removed. Peripheral devices (sensors, for instance) may in turn be connected correspondingly quickly and simply to the measuring transducer. The combination of measuring transducer plus connected cable may also thus be considered to be a measuring transducer. At the end of the cable distant from the measuring transducer, an additional field device (a sensor, for instance) is thereby connected via the inductive interface. At the other end of the cable, i.e., at the side of the measuring transducer, the cable is connected with said measuring transducer by means of a contact interface.

Field devices require inputs in the form of digital data for the most varied tasks. For instance, these must be transferred to the field device via an additional interface, e.g., via a USB interface, by means of SD card, or via Ethernet or another bus. If the field device is designed as a sensor, the data must be transferred to the sensor via a measuring transducer connected to said sensor.

All of these ways are either cumbersome or require an additional interface.

The present disclosure is based upon the aim of transferring digital data to a field device in a simple manner.

The aim is achieved via a measurement arrangement including: a first process automation technology field device, wherein the first field device includes a first (in particular, an inductive) interface and a data processing unit and wherein a second process automation technology field device can be connected to the first interface, and a data transfer device having a second (in particular, inductive) interface that is designed to complement the first interface, wherein the data transfer device can be connected via this to the first field device, wherein the data transfer device includes a data transfer module with which digital data can be transferred from a source to the data processing unit of the first field device via the data transfer device and the first or second (in particular, inductive) interface.

An inductive interface allows the fast connection of sensors to and removal of sensors from the field device. This advantage can be utilized in order to momentarily connect a data transfer device to the inductive sensor interface. After the transfer of the data, the interface is then available again for the sensor operation. An additional interface for data transfer is not necessary. On the other hand, a transport medium for digital data and a possibility of transferring the data from the source to the medium are required. Here, a technology that is widespread is advantageous.

In an embodiment, the data transfer module of the data transfer device is therefore a Bluetooth module, in particular, a Bluetooth Low Energy module.

In another embodiment, the data transfer module of the data transfer device is therefore a barcode reader—in particular, a 2-D barcode reader.

In an embodiment, the first field device is a sensor for measuring measurement values of at least one measurement variable and the measurement arrangement includes the second field device, and the second field device is a measuring transducer.

In another embodiment, the first field device is a measuring transducer and the measurement arrangement includes the second field device, and the second field device is a sensor.

The object is likewise achieved via a method for temporarily transferring digital data from a source by means of a measurement arrangement as described above, including the steps: temporarily connecting the data transfer device to the first field device via the first and second (in particular, inductive) interface, transferring the digital data from the source to the data transfer device by means of the data transfer module, transferring the digital data from the data transfer device to the data processing unit of the first field device via the second and first (in particular, inductive) interface, and processing the digital data via the data processing unit.

In an embodiment, the data transfer module of the data transfer device is a Bluetooth module—in particular, a Bluetooth Low Energy module—and a mobile device reads in the digital data, and these are transferred from the mobile device to the data transfer device—and ultimately to the first field device—by means of Bluetooth via the data transfer module.

In another embodiment, the data transfer module of the data transfer device is a barcode reader—in particular, a 2-D barcode reader—and the barcode reader reads in the digital data, and these are ultimately sent to the first field device.

In a further development, the digital data may include an unlock code for unlocking additional functionalities of the first and/or second field device; device settings of the first and/or second field device; software modules of the first and/or second field device; data for modifying the firmware of the first and/or second field device; and/or calibration data of the first and/or second field device.

If the first field device is designed as a measuring transducer, and the second field device is designed as a sensor, the method includes the following additional steps: removing the data transfer device from the measuring transducer, connecting the sensor to the measuring transducer, transferring the digital data from the measuring transducer to the sensor, and processing the digital data via the sensor.

The digital data are thereby transferred first from the source via the data transfer device to the measuring transducer. These may be pre-processed or additionally processed there, as applicable. After the data transfer device has been removed from the inductive interface, a second field device viz., the sensor, is connected. The digital data are then transferred to the sensor. This likewise includes a data processing unit. The digital data are accordingly further processed there. For instance, additional functionalities of the sensor may thereby be unlocked.

The sensor may thus, on the one hand, be designed as a first field device and, on the other hand, as a second field device.

BRIEF DESCRIPTION OF THE DRAWINGS

The present disclosure is further explained in more detail by means of the following figures. Illustrated are.

DETAILED DESCRIPTION

In the figures, the same features are marked with the same reference symbols.

The measurement arrangement according to the present disclosure, in its entirety, has the reference symbol 31.

Figure 1:
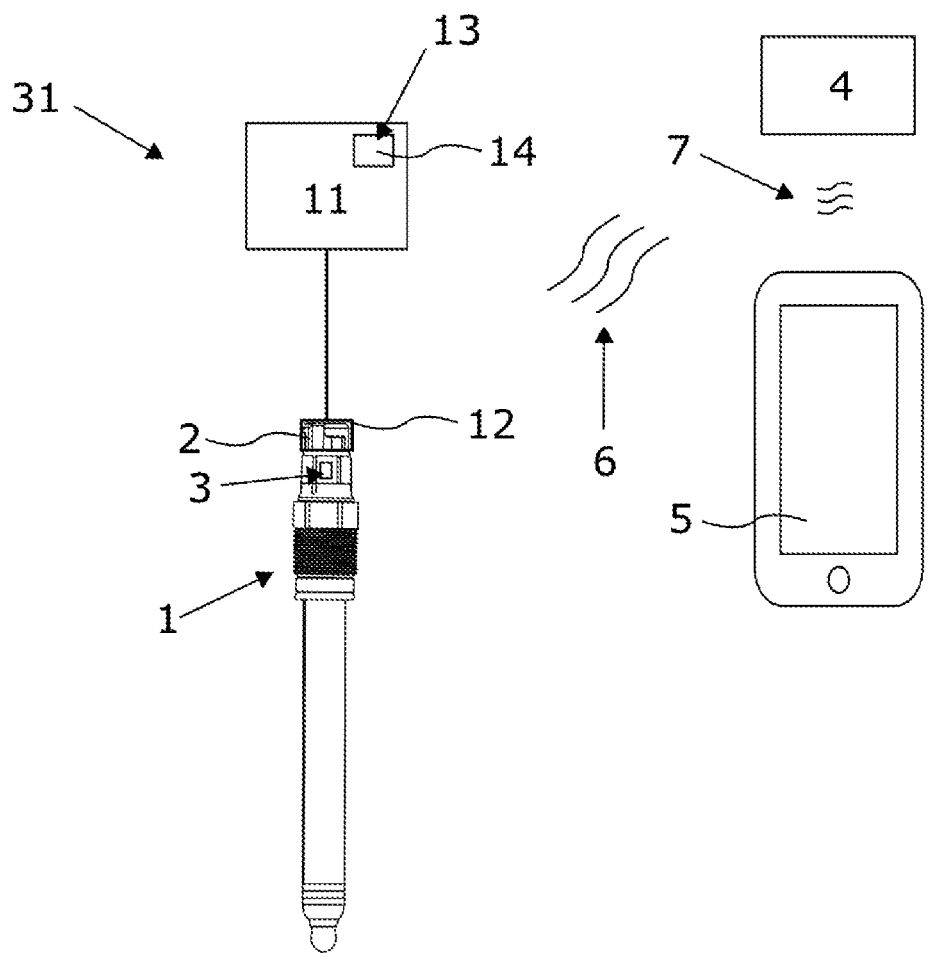
FIG. 1 shows the measurement arrangement according to the present disclosure in a first embodiment.

A first embodiment is depicted in FIG. 1. The first field device 1 therein is designed as a pH sensor. However, any other sensor—for instance, a conductivity sensor, a sensor for measuring a concentration such as nitrate, nitrite, ammonium, etc.—is likewise conceivable. The sensor 1 includes a data processing unit 3 for processing digital data. The sensor 1 includes a first interface 2—here, an inductive interface.

Connected to the sensor 1 is a data transfer device 11. This in turn includes a second interface 12 that is designed to complement the first interface 2. In the example, both interfaces 2, 12 are designed as inductive interfaces. The data transfer device 11 includes a data transfer module 13—here, a Bluetooth module 14. The Bluetooth module 14 is designed as a low energy Bluetooth module, for instance.

The source 4 includes digital data. These digital data are discussed in more detail further below. A mobile device 5 reads in the digital data from the source 4. If the data in the source 4 are present in the form of a barcode (in particular, a 2-D barcode), for instance, the mobile device 5 may take a photographic exposure 7 via the integrated camera of the mobile device 5, for instance. In general, a transfer 7 of the digital data to the mobile device 5 takes place. The mobile device 5 may be of varying design, such as a mobile telephone, tablet, smartphone, or any other mobile unit with corresponding reading capability. The mobile device 5 likewise includes a Bluetooth module. The digital data are transferred by means of a Bluetooth connection 6 to the data transfer device 11—more precisely, to the data transfer module 13. The data transfer device 11 in turn transfers the digital data to the first field device 1 via the interfaces 2, 12. The data processing unit 3 processes these data accordingly; this is likewise discussed in further detail below.

In one embodiment, the data transfer device 11 is powered by a battery or rechargeable cell. In a further embodiment, power is also transferred via the two interfaces 2, 12.

Figure 2A:
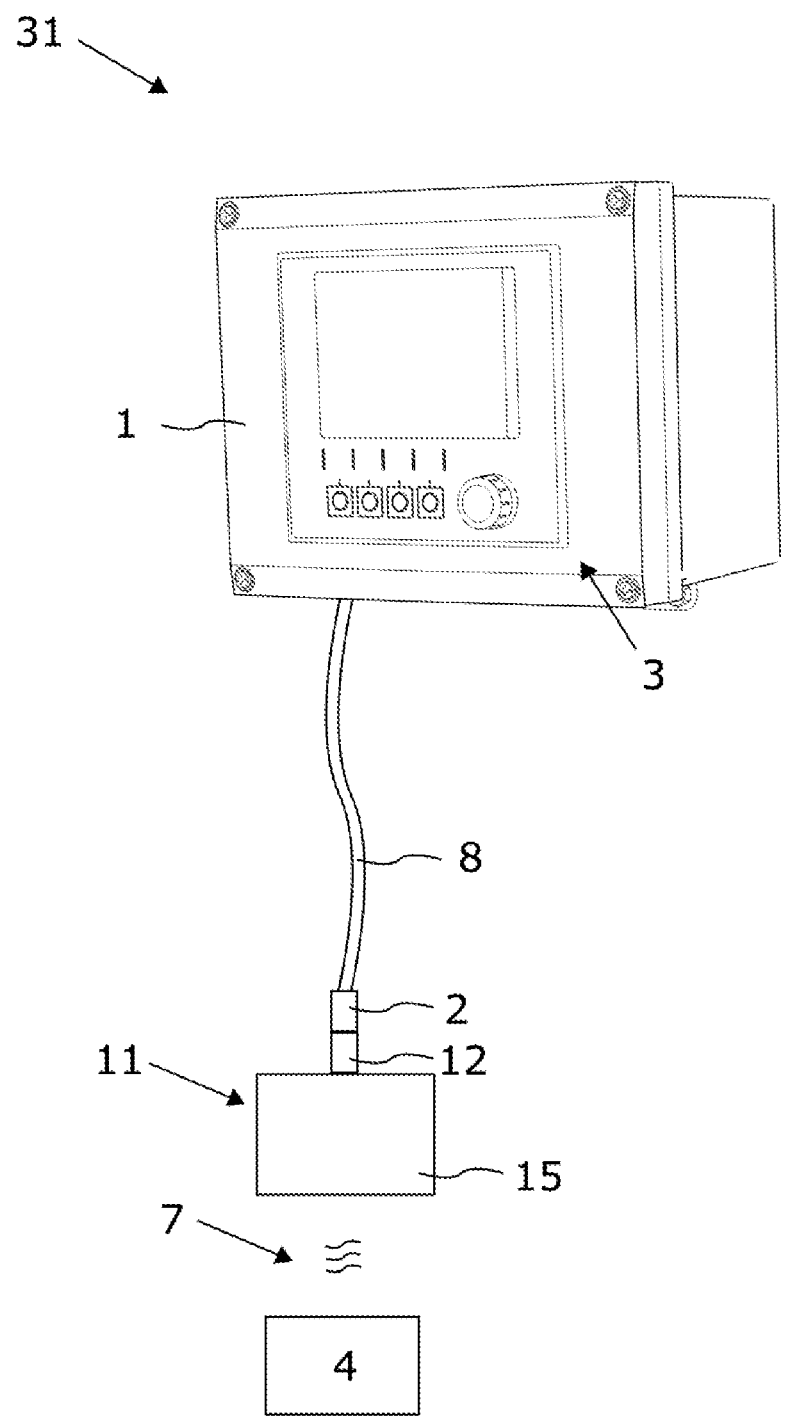
FIG. 2A/B shows the measurement arrangement according to the present disclosure in a second embodiment.

In a further embodiment shown in FIG. 2A, the first field device 1 is designed as a measuring transducer. The measuring transducer 1 includes a data processing unit 3. A cable 8 is connected to the measuring transducer—for instance, via a contact interface. Located at the other end of the cable 8 is the first interface 2, here designed as an inductive interface.

Connected to the first interface 2 is a data transfer device 11. The data transfer device 11 includes a second interface 12 that is complementary to the first. Interface 12 is thus likewise designed here as an inductive interface. The data transfer device 11 is here designed as a barcode reader 15—more precisely, as a 2-D barcode reader. The barcode reader 15 reads in the digital data from the source 4 by means of a connection 7. Via the connection 7 to the data transfer device 11, the digital data are transferred via the interfaces 2, 12 to the measuring transducer 1, and then to the data processing unit 3. There, they are accordingly processed further.

Figure 2B:
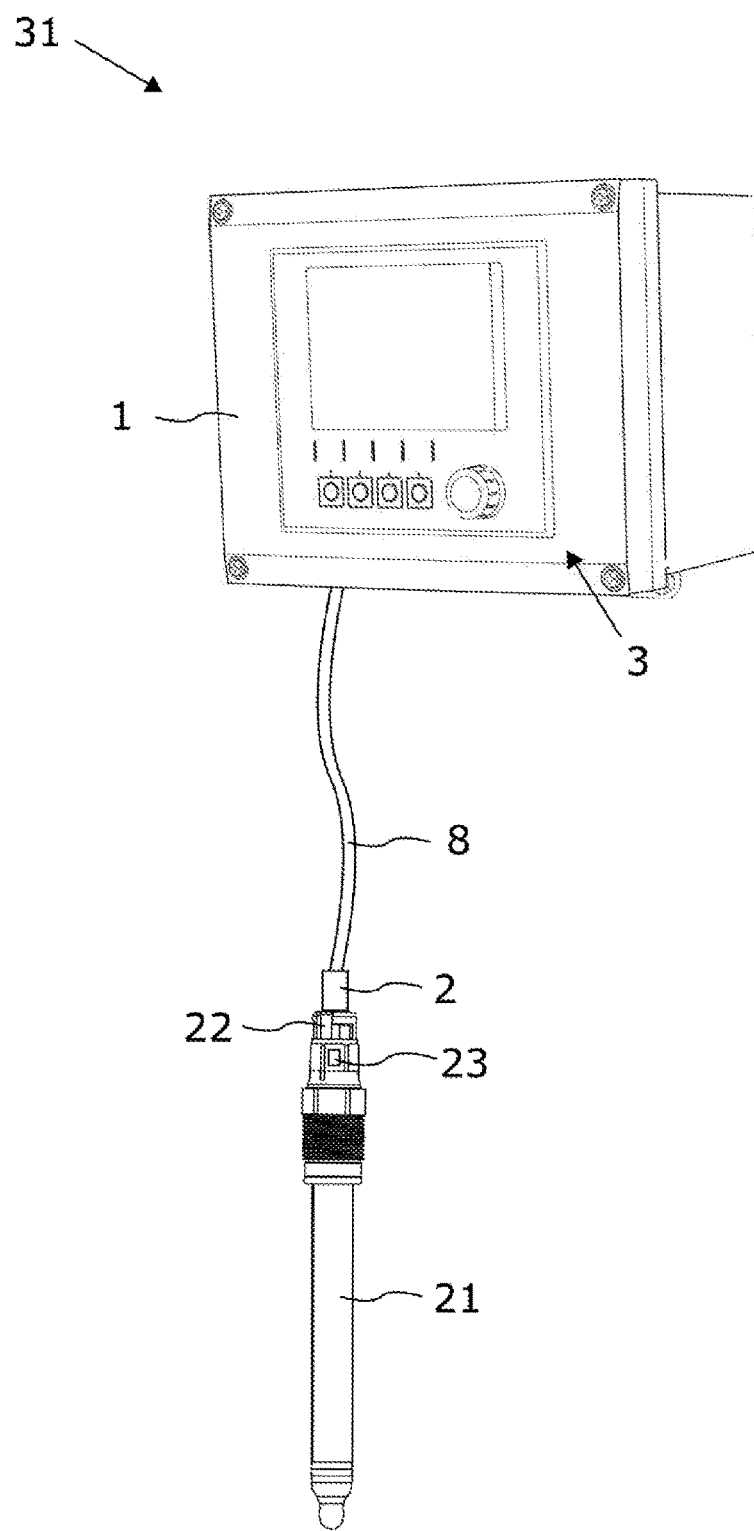

In the next step of the method according to the present disclosure (depicted in FIG. 2B), a second field device 21 is connected to the first interface 2. In the example, the second field device 21 is designed as a sensor. The second field device 21 includes a data processing unit 23. The field device 21 is connected via an interface 22 to the first interface 2, and thereby to the measuring transducer 1. The interface 22, also, is here designed as an inductive interface. The digital data that were transferred to the measuring transducer 1 (or to the data processing unit 3) by means of the data transfer device 11 are now transferred to the second field device 21 and its data processing unit 23.

The digital data may include an unlock code for unlocking additional functionalities of the first and/or second field device 1, 21; device settings of the first and/or second field device 1, 21; software modules of the first and/or second field device 1, 21; data for modifying the firmware of the first and/or second field device 1, 21; and/or calibration data of the first and/or second field device 1, 21.

A single-use case is, therefore, that a user has acquired a new functionality for this field device 1, 21, which—according to the present disclosure—he then may activate via the input of unlock codes. The data are provided in the form of barcodes (for example, QR code or data matrix code). For this, the codes may be sent simply via e-mail and subsequently printed out on paper, for example.

The data are transferred to the field device as follows: In a first variant, a barcode reader provided with an inductive interface, which barcode reader uses the same protocol as the sensor, is connected to the inductive interface of the field device. While the connection exists, the optically read-in barcodes are transferred directly to the field device. In a second variant, a Bluetooth module (in particular, Bluetooth Low Energy) is connected to the inductive interface of the field device with an inductive coupling (the same protocol as the sensor). A Bluetooth connection to the module is established by a mobile device with camera—for example, a smartphone or tablet. The connection may also already exist prior to the connection of the module to the field device. The barcodes are subsequently read in by the camera of the mobile device, decoded by a corresponding software on the mobile device, and transferred via the Bluetooth connection to the module, and from there to the field device.

A combination of the various embodiments of the first field device 1 and the data transfer device 11 is, of course, possible. For instance, a barcode reader 15 may also be connected to a sensor as a first field device 1, or a Bluetooth module 14 may be connected to a measuring transducer.

What is claimed is:

1. A measurement arrangement, comprising:
   a first process automation technology field device having a first inductive interface and a data processing unit, the first inductive interface embodied to connect to a second process automation technology field device; and
   a data transfer device having a second inductive interface and a data transfer module, the second inductive interface complementary to the first inductive interface, wherein via the second inductive interface the data transfer device is configured to connect to the first process automation technology field device, wherein the data transfer module is a Bluetooth Low Energy module that is detachably connected to the first process automation technology field device using the first inductive interface and the second inductive interface to transfer digital data from a source to the data processing unit of the first process automation technology field device via the data transfer device and the first inductive interface and the second inductive interface;

wherein the second inductive interface of the data transfer device is configured to be disconnected from the first inductive interface of the first process automation technology field device after the digital data is transferred from the data transfer device and to the first process automation technology field device; and wherein, after the second inductive interface of the data transfer device is disconnected from the first inductive interface of the first process automation technology field device, the second process automation technology field device is configured to be connected to the first process automation technology field device via an inductive interface of the second process automation technology field device and the first inductive interface.

2. The measurement arrangement according to claim 1, wherein the second process automation technology field device is a measuring transducer, and wherein the first process automation technology field device is a sensor for measuring measurement values of at least one measurement variable.

3. The measurement arrangement according to claim 1, wherein the second process automation technology field device is a sensor, and wherein the first process automation technology field device is a measuring transducer.

4. The measurement arrangement according to claim 1, wherein, before the data transfer device is temporarily connected to the first process automation technology field device via the first inductive interface and the second inductive interface, the inductive interface of the second process automation technology field device is disconnected from the first inductive interface of the first process automation technology field device.

5. The measurement arrangement according to claim 1, wherein the data transfer device and the second process automation technology field device alternately connect to the first process automation technology field device via the first inductive interface.

6. A method for transferring digital data from a source to a data processing unit, comprising:
providing
a first process automation technology field device having a first inductive interface and a data processing unit, the first inductive interface embodied to connect to a second process automation technology field device, and
a data transfer device having a second inductive interface and a data transfer module, the second inductive interface complementary to the first inductive interface, wherein via the second inductive interface is configured to connect the data transfer device to the first process automation technology field device,
wherein the data transfer module is a Bluetooth Low Energy module that is detachably connected to the first process automation technology field device using the first inductive interface and the second inductive interface to transfer the digital data from a source to the data processing unit of the first process automation technology field device via the data transfer device and the first inductive interface and the second inductive interface;

temporarily connecting the data transfer device to the first process automation technology field device via the first inductive interface and the second inductive interface;

transferring the digital data from the source to the data transfer device using the data transfer module;

transferring the digital data from the data transfer device to the data processing unit via the second inductive interface and the first inductive interface;

processing the digital data via the data processing unit;

disconnecting the second inductive interface of the data transfer device from the first inductive interface of the first process automation technology field device; and connecting the inductive interface of the second process automation technology field device to the first inductive interface of the first process automation technology field device.

7. The method according to claim 6, wherein the digital data include one or more of the following: an unlock code for unlocking additional functionalities of the first process automation technology field device and/or the second process automation technology field device; device settings of the first process automation technology field device and/or the second process automation technology field device; software modules of the first process automation technology field device and/or second process automation technology field device; data for modifying the firmware of the first process automation technology field device and/or the second process automation technology field device; and calibration data of the first process automation technology field device and/or the second process automation technology field device.

8. The method according to claim 6, wherein the first process automation technology field device is a measuring transducer and the method further comprises:
disconnecting the data transfer device from the measuring transducer;
connecting the second process automation technology field device, embodied as a sensor, to the measuring transducer;
transferring the digital data from the measuring transducer to the second process automation technology field device; and
processing the digital data via the second process automation technology field device.

9. The method according to claim 6, wherein the method further comprises disconnecting the inductive interface of the second process automation technology field device from the first inductive interface of the first process automation technology field device prior to temporarily connecting the data transfer device to the first process automation technology field device.

10. The method according to claim 6, wherein the method further comprises alternately connecting the data transfer device and the second process automation technology field device to the first automation technology field device via the inductive interface.

* * * * *